US012663261B2

(12) United States Patent 
Volkmar et al.

(10) Patent No.: US 12,663,261 B2 
(45) Date of Patent: Jun. 23, 2026

(54) METHOD FOR CREATING A 3D SCAN AND CONTACT ELEMENT FOR SUCH A METHOD

(71) Applicant: OTTOBOCK SE & CO. KGAA, Duderstadt (DE)

(72) Inventors: Julia Volkmar, Duderstadt (DE); Judith Wille, Duderstadt (DE); Mario Koppe, Duderstadt (DE); Benjamin Schirrmeister, Duderstadt (DE); Viktor Hörig, Duderstadt (DE); Leon Fiolka, Duderstadt (DE)

(73) Assignee: OTTOBOCK SE & CO KGAA, Duderstadt (DE)

( * ) Notice: Subject to any disclaimer, the term of this patent is extended or adjusted under 35 U.S.C. 154(b) by 235 days.

(21) Appl. No.: 17/523,902

(22) Filed: Nov. 10, 2021

(65) Prior Publication Data

US 2022/0187059 A1 Jun. 16, 2022

Related U.S. Application Data

(63) Continuation-in-part of application No. PCT/EP2020/080097, filed on Oct. 27, 2020.

(51) Int. Cl. 
*G01B 11/24* (2006.01) 
*G01B 5/20* (2006.01)

(52) U.S. Cl. 
CPC .............. *G01B 11/24* (2013.01); *G01B 5/20* (2013.01)

(58) Field of Classification Search 
CPC ........... G01B 11/24; G01B 5/20; A43B 17/00; A43D 1/022; A43D 1/025; A61F 2002/5049; A61F 2002/505; A61F 2002/5053; A61F 5/0102; A61F 5/14; A61F 5/01

USPC .......................................................... 356/601 
See application file for complete search history.

(56) References Cited

U.S. PATENT DOCUMENTS

| | | | | |
|---|---|---|---|---|
| 6,205,230 | B1 * | 3/2001 | Sundman ............... | G01B 21/20 |
| | | | | 382/100 |
| 7,552,494 | B2 * | 6/2009 | Peterson .................. | A43D 1/02 |
| | | | | 33/3 R |
| 9,996,981 | B1 * | 6/2018 | Tran .......................... | A43B 3/34 |
| 2006/0076700 | A1 * | 4/2006 | Phillips .................. | A43D 1/025 |
| | | | | 264/40.1 |

(Continued)

FOREIGN PATENT DOCUMENTS

| | | |
|---|---|---|
| DE | 1020130020012 A1 | 8/2014 |
| DE | 102014102628 A1 | 8/2015 |
| WO | 2012052044 A1 | 4/2012 |

OTHER PUBLICATIONS

International Search Report issued in International Application No. PCT/EP2020/080097, mailed Mar. 31, 2021, 3 pgs.

*Primary Examiner* — Isiaka O Akanbi 
(74) *Attorney, Agent, or Firm* — HOLLAND & HART LLP

(57) ABSTRACT

The invention relates to a method for creating a 3D scan of a body part which includes the steps of
 a. Molding a contact element to the body part,
 b. Capturing a first partial scan of the body part,
 c. Removing the body part from the contact element,
 d. Capturing a second partial scan of the contact element, and
 e. Creating the 3D scan at least also from the first partial scan and the second partial scan.

19 Claims, 4 Drawing Sheets

(56) References Cited

U.S. PATENT DOCUMENTS

Figure 1:
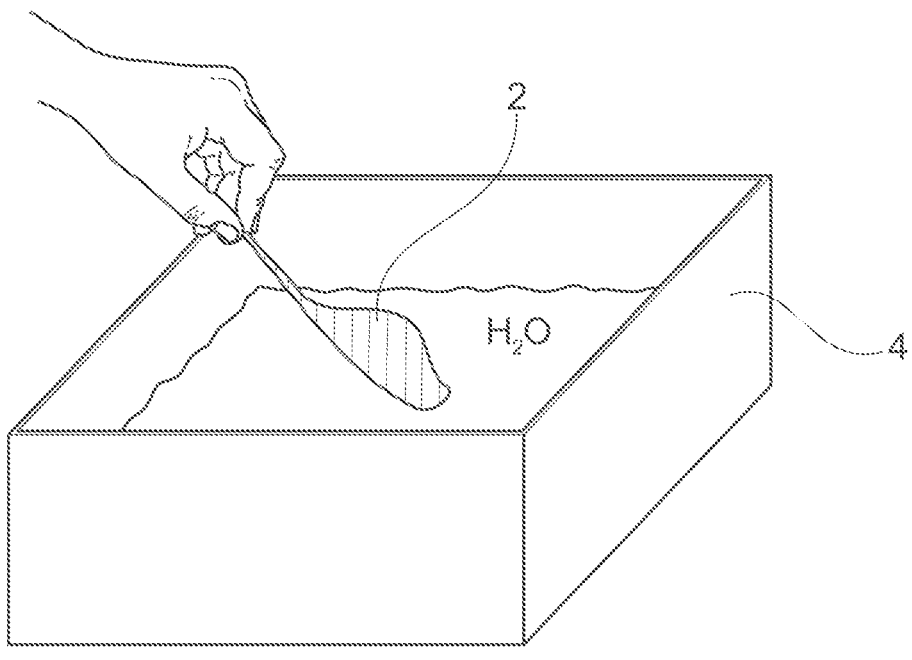

| | | | |
|---|---|---|---|
| 2006/0103852 A1* | 5/2006 | Klaveness | A61B 5/1078 356/601 |
| 2006/0283243 A1* | 12/2006 | Peterson | A61B 5/1036 73/172 |
| 2012/0131817 A1* | 5/2012 | Kaakkola | A43B 7/1464 428/156 |
| 2013/0291399 A1* | 11/2013 | Fonte | A43B 7/1445 36/44 |
| 2014/0149072 A1* | 5/2014 | Rutschmann | A43D 1/06 702/167 |
| 2014/0276094 A1* | 9/2014 | Lidtke | A61B 5/1074 600/476 |
| 2015/0165690 A1* | 6/2015 | Tow | B33Y 10/00 700/119 |
| 2015/0378350 A1* | 12/2015 | Stumpf | G05B 19/408 264/219 |
| 2016/0249807 A1* | 9/2016 | Mougin | A61B 5/1074 600/407 |
| 2016/0278947 A1* | 9/2016 | Martin | A61F 2/70 |
| 2016/0374431 A1* | 12/2016 | Tow | A43D 1/022 36/43 |
| 2017/0068774 A1* | 3/2017 | Cluckers | A61B 5/743 |
| 2017/0231320 A1* | 8/2017 | Nuñez | A43B 1/0045 36/93 |
| 2017/0318900 A1* | 11/2017 | Charlesworth | B33Y 50/02 |
| 2017/0360298 A1* | 12/2017 | Mougin | A61B 5/0073 |
| 2018/0028336 A1* | 2/2018 | Pallari | A61F 5/14 |
| 2018/0177624 A1* | 6/2018 | Vlasic | A43B 7/141 |
| 2019/0209093 A1* | 7/2019 | Watts | A61B 5/004 |
| 2019/0320758 A1* | 10/2019 | Radovic | A43B 7/141 |

* cited by examiner

METHOD FOR CREATING A 3D SCAN AND CONTACT ELEMENT FOR SUCH A METHOD

The invention relates to a method for creating a 3D scan of a body part as well as a contact element that can be used in such a method.

In various fields of orthopedic technology, it is necessary to individually adapt objects or components of objects to a patient's body parts. This applies to orthoses as well as prostheses, prosthesis sockets and other support devices that are intended to provide support during heavy physical work, for example. Various methods are known from the prior art for molding or scanning the body part to be treated with an orthopedic device in order to obtain or be able to produce a negative mold and/or a positive mold of the body part.

Despite the considerable progress made in scanner technology and scanning techniques in recent years, it is often the case in orthopedic technology that the body part to be treated is plastered in order to obtain a negative mold of the respective body part after the plaster has hardened. The advantage of this method is that an orthopedic technician conducting the method comes into contact with the body part and is thus able to obtain a negative mold of the body part subjected to a certain load or shaping. For example, it is advantageous to palpate an amputation stump, such as an upper leg amputation stump, during molding with the plaster, i.e. to examine it in particular by way of touch. It is thus possible to determine, for example, the location, position and length of bones, soft parts or scar tissue, and to take this into account during shaping. Experienced orthopedic technicians in particular do not want to forego the haptic feedback they receive in this way, as this feedback is not available with subsequent adjustments to a computer model.

This type of shaping is also advantageous during the production of orthoses. For example, if a drop foot orthosis is to be produced that is used to support a raising of a foot, it is impractical to mold the foot when it is not subjected to a load as the patient is not able to raise their foot themselves. Rather, it is practical and important for the orthosis to mold the foot when it is in the raised state that is to be supported or enabled by the orthosis. This, too, is only possible when the orthopedic technician is in contact with the body part to be molded, i.e. in the present case the foot.

This haptic interaction with the body part to be molded, which is necessary and important for the best possible result, goes against the use of contactless scanning technology. However, it does have a range of other advantages. If a body part of the wearer is plastered, it is unpleasant and uncomfortable for the wearer, and is relatively time-consuming. The body part also becomes very dirty. If the plaster cast produced is to subsequently be removed from the body part, it must also be cut or sawn open in order to be able to remove the body part from the plaster cast. This may result in damages to the mold that have to be compensated for and rectified.

The invention thus aims to further develop a method for creating a 3D scan of a body part in such a way that the disadvantages of the prior art are eliminated or at least mitigated.

The invention solves the problem by way of a method for creating a 3D scan of a body part, the method comprising the following steps: a) molding a contact element on the body part, b) capturing a first partial scan of a body part, c) removing the body part from the contact element, d) capturing a second partial scan of the contact element and e) creating the 3D model at least also from the first partial scan and the second partial scan.

The method according to the invention combines the advantages of the methods known from the prior art. The contact element is first molded on the body part. The orthopedic technician carrying out the method can interact in a haptic manner, for example palpating, feeling or correcting, with the body part to be molded. This can be done while the body is not subjected to a load, or when it is subjected to a load. The contact element is preferably designed such that it can be deformed and can thus be brought into the desired shape; it is especially preferable if the body part can be brought into the desired shape at the same time. Once this has been done, only a first partial scan of the body part is initially captured. 3D scanners known from the prior art can be used for this purpose. Handling is rendered especially easy with a mobile handheld scanner, i.e. a scanner that can be held in the hand and moved. The scanner can thus be moved with particular ease around the body part that the first partial scan of the body part captures as completely as possible.

However, for a complete 3D scan of the body part, from which a 3D model can subsequently be created, it is necessary to also capture the surface of the body part that is covered by the contact element and therefore cannot be seen by the scanner. To this end, the body part is removed from the contact element. The surface with which the contact element was applied to the body part is then captured in the form of a second partial scan. The surface of the contact element, in this case visible and scanned, is a negative mold of the contact surface of the body part with the changes and/or adjustments made by the orthopedic technician or another user of the method. The visible part of the body part can thus be captured in the first partial scan, while the hidden part of the body part, namely the part that was covered by the contact element, is captured in the second partial scan as a negative mold of the contact element. The two partial scans can subsequently be amalgamated in an electronic data processing device, thereby enabling a preferably complete 3D scan of the body part and, from that, a 3D model to be created.

With this method, the person performing the method, especially the technician, can receive and get the haptic feedback and impressions that still make the plaster process so beneficial today without also having the high degree of soiling, time and manual effort of the plaster process. At the same time, the very effective and precise scans that can be obtained with a 3D scanner can be used. In particular, in the event that a component is to be machine-produced on the basis of the 3D scan created in this way, for example by means of a 3D printer, a CNC milling machine or another computer-controlled tool, this procedure is advantageous, since the electronically available data of the 3D scan created in the electronic data processing device can be made directly available to the respective tool with or without additional processing.

To be able to amalgamate the at least two partial scans, it is advantageous to use at least one reference point that is included in both partial scans. To create the 3D scan from the at least two partial scans, the at least one reference point in both partial scans is brought to overlap. Preferably, at least two, especially preferably at least three, reference points are provided.

The at least one reference point is preferably arranged on and/or in the contact element and is scanned during the at least two partial scans. It can be printed, glued or otherwise connected to the contact element.

Prior to capturing the first partial scan, the body part is preferably positioned on a contact surface in such a way that the contact element is arranged between the body part and the contact surface. The contact surface of the body part, with which it rests on the contact surface and thus on the contact element arranged between the body part and the contact surface, can usually not be captured in the first partial scan, as it is not visible from the outside. It is captured in the second partial scan. The contact surface preferably acts as a reference surface in which the reference points are defined. It is therefore beneficial if the contact element is not moved relative to the contact surface when the body part is removed from the contact element.

It makes sense to use a contact surface especially for body parts that will be subjected to a load when the orthopedic product is used later. The load may have an influence on the outer shape of the body part, for example a foot or leg, so that in these cases in particular, for example to produce an orthosis for the foot and/or ankle area, at least the first partial scan should be captured when said body part is subjected to a load. If it is not necessary to capture a partial scan when the body part is subjected to a load, for example to produce some devices for the upper limb, it is advantageous to conduct the method without a contact surface. If the stump is to be captured, the use of a moldable contact element, for example in the elbow region, may be advantageous, as the orthopedic surgeon carries out regular changes in this region.

In a preferred embodiment, the contact element is brought into a state in which it can be deformed prior to molding. After molding on the body part, it is brought into a dimensionally stable state. Before the method is performed, the contact element is preferably in the dimensionally stable state. From here, it can be brought into a deformable state, particularly preferably by heating, especially in a water bath. To this end, the contact element is preferably made of a plastic with thermoplastic properties, i.e. it can be brought into a deformable state by heating. It is especially preferable if it is a material that can already be deformed at low temperatures, preferably lower than 60°, especially preferably lower than 55° C., so that it can also be placed on the body part in this state without it being uncomfortable. In this state, the contact element is molded on the body part, as previously described. The contact element is preferably held or fixed to the body part until the contact element has returned to a dimensionally stable state. This preferably occurs through cooling. To this end, it is often enough to wait several minutes and cool the contact element by way of thermal contact with the ambient air. Alternatively, active cooling can be used: this entails, for example, cooling elements being brought into thermal contact with the contact element.

The contact element is preferably not moved relative to a reference marking, which is preferably arranged on the contact surface, between the capture of the first partial scan and the capture of the second partial scan. When creating the 3D scan, the data of the first partial scan and the data of the second partial scan are amalgamated in an electronic data processing device. The data can initially be combined into a pure combination of the two partial scans. Alternatively, a 3D model is generated directly from the combination of both partial scans. In this case, further adjustments are preferably conducted and a volume model generated. To combine the partial scans, it is advantageous that the orientation and position of the two partial scans and the respective data forming the respective partial scan are known relative to each other. This makes it particularly easy to amalgamate the two partial scans in the right position and orientation. To this end, a reference marking is used that can be identified in both the data of the first partial scan and the data of the second partial scan. The reference marking is designed in such a way that it clearly determines the position and orientation of the two images, i.e. the partial scans, in relation to each other. However, it is beneficial and important that the contact element is not moved relative to the reference marking between the capture of the two partial scans. In an especially simple embodiment, the contact surface forms part of a separate device, such as a plate, a board or a different base, wherein the contact surface itself bears the reference marking. Alternatively or additionally, reference markings can also be applied to the body part and/or the contact element that make it easier to combine the first and second partial scan.

Preferably, the first partial scan and/or second partial scan are captured by means of a 3D scanner, preferably a mobile 3D scanner. If a mobile 3D scanner is used, it can be moved particularly easily relative to the respective motif to be captured, i.e. the body part or the contact element, so that a partial scan, in particular of the body part, is possible that is as complete as possible. If, however, a fixed 3D scanner is used, it is possible to forego a reference marking, provided that the contact element remains unmoved relative to the fixed 3D scanner between the capture of the first partial scan and the capture of the second partial scan. If the orientation and position of the fixed 3D scanner relative to the contact surface is known in this case, it is possible to forego an additional, separate reference marking.

Preferably, the body part is brought into a target position during molding of the contact element. In this target position, which preferably does not correspond to the neutral position that the body part assumes when no external forces are acting on it, the contact element is molded and hardens. The first partial scan is then captured and the body part scanned in the target position. This is particularly advantageous for contracted body parts. These body parts have a forced deformity, which can be caused, for example, by a shortening or shrinking of a tissue, for example a muscle, a tendon or a ligament. In this neutral position, the body part is often not fully functional, especially if it is a limb, such as a hand. A careful selection of the target position enables, for example, the production of an orthosis using the scan data determined in this way that holds the body part in the target position and can thus enable functions.

The target position of the body part is preferably adjusted through a suitable selection of the contact element and/or a base body that is arranged on the contact element. To bring the body part into different target positions, multiple contact elements can be provided in different basic shapes and/or sizes. In order to be able to change from one contact element to another contact element as easily as possible, it is advantageous if the contact element is arranged on a holder or base body. The arrangement on the base body and/or the release from the base body is preferably easy. To this end, the contact element is, for example, placed on a peg, mandrel or pin of the base body, so that it is arranged around the base body. If the base body is a hand, it can be brought into the desired target position and thus the desired grip pattern by way of the selection of the contact element and/or base body. To this end, the base body and/or the contact element is preferably brought into the desired shape by means of a molding material. The molding material can preferably be brought into a desired form in which it then hardens. A predominantly cylindrical basic shape with a suitable diameter could bring the hand into a suitable position for holding a glass. At the same time, the contact element can also still be adapted to the shape of the body part in its original form and thus form the area of the thumb, for example.

The contact element is preferably a cylindrical element with a recess into which the base body or its peg, mandrel or pin is inserted. The recess may be a blind hole that has only one open end in one of the front sides of the cylindrical element. Alternatively, the recess may be a through-hole that consequently has two open ends in the two front sides of the cylindrical element. Various contact elements preferably differ in the inner diameter of the recess, the outer diameter and/or the length of the cylindrical element.

In a preferred embodiment, the contact element is made of a silicone, preferably a 2-part silicone, which is hardened prior to capturing the first partial scan. Different components may cross-link during hardening, for example. "Hardening" is understood to mean any method by which the strength of the contact element, i.e. the mechanical stability and dimensional stability, is increased.

The invention also solves the problem by means of a contact element that can be used in one if the methods described here. The contact element has an original shape and can be brought into a deformable state, especially through heating, and into a dimensionally stable state, especially through cooling.

In a preferred embodiment, the contact element is at least also made of a material that deforms into an original shape without the application of external force when it is brought into the deformable state. It is especially preferable if the contact element is completely made of such a material. Such a contact element can be used several times in a particularly simple and convenient way. After it has been molded to the body part by carrying out any of the methods described here, it may be brought into the deformable state by, for example, heating it. Without any further external force being applied, the material then deforms into the initial shape or original shape in which it was originally produced. The material has a so-called shape memory, also known as a "memory" effect. This means that once the original shape has been produced, it can be produced again even after the contact element has been deformed, for example in a process described here, by bringing the material and thus the contact element into the deformable state. For this purpose, it is not necessary to exert any further force on the material or the contact element.

Preferably, the original shape is adapted to the shape of the body part. However, this adjustment is not necessarily adapted to the individual body part, but merely follows a standard shape for that body part. For example, for a drop foot orthosis it is advantageous for the contact element to be preformed in such a way that it already reproduces the arch of the foot. A heel cap can also preferably already be included in the original shape. This adjustment also makes it possible to integrate support functions, cushions or padding into the contact element, which then only need to be slightly changed in position and/or orientation when the contact element is later molded onto the body part. It has also been shown that without sufficient preforming of the original mold, wrinkles quickly occur during molding, as the material has to be deformed too much.

In the following, an example of an embodiment of the present invention will be explained in more detail by way of the attached figures: They show FIGS. 1 to 4—different steps in a method according to an example of an embodiment of the present invention, FIG. 5—a contact element and FIGS. 6 to 8—steps in a method in another example of an embodiment of the method.

FIG. 1 shows a contact element 2 that is inserted into a container 4, which contains heated water. This heats the contact element 2. It is made at least partially, but preferably completely, of a material with a shape memory. Such a material can be brought back into its original shape by heating, for example. This occurs in the step of the method shown in FIG. 1.

Figure 2:
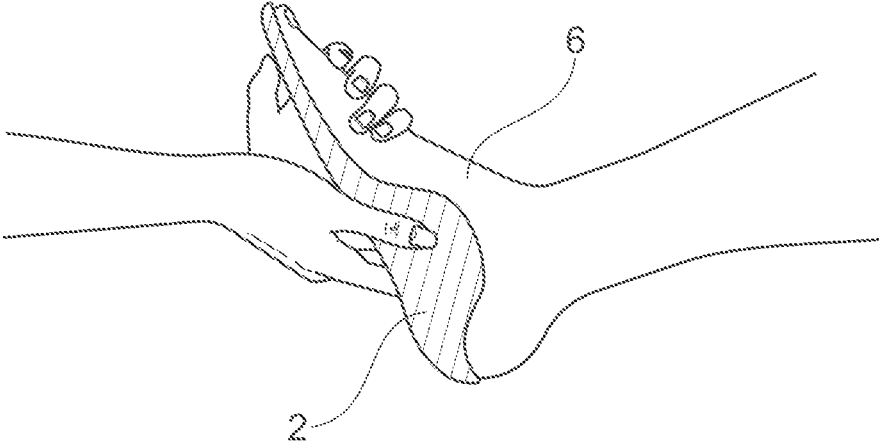

FIG. 2 depicts the molding of the contact element 2 to the body part 6, which is a foot in the example of an embodiment shown. As depicted in FIG. 2, the shape of the contact element 2 can be manually manipulated in order to press it into the desired shape. Consequently, the contact element 2 does not capture the shape of the body part 6 when it is not subjected to a load, but the person performing the method, such as an orthopedic technician, can palpate as usual and thus bring the body part 6 into the desired shape and subject it to the desired load; this can, for example, provide a certain support depending on the medical indication. The contact element 2 is held in the position shown in FIG. 2 until it hardens and is in a dimensionally stable state.

Figure 3:
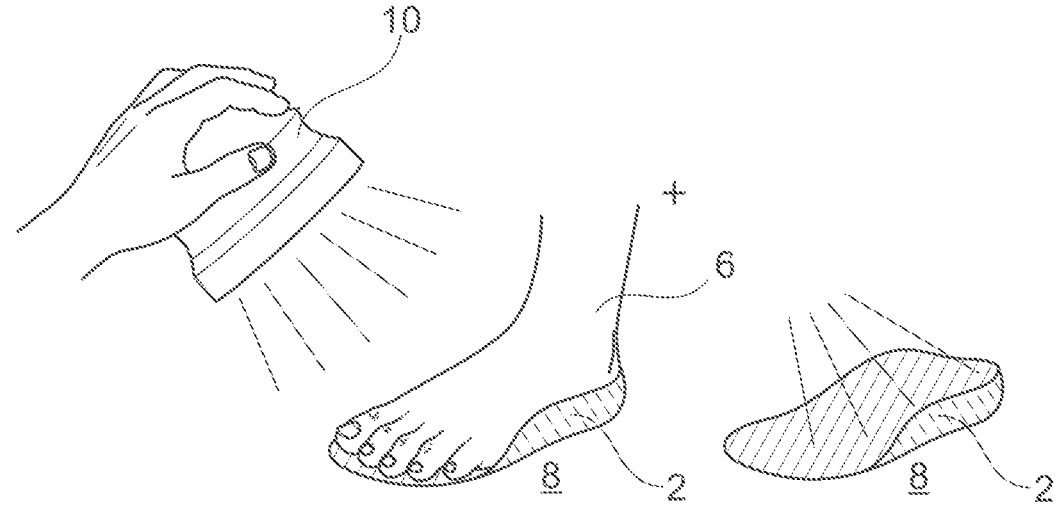

The body part 6, in this example with the contact element 2, is then positioned on a contact surface 8, as shown in the left-hand part of FIG. 3. A scanner 10 is used to capture a first partial scan of the body part 6. In the example of an embodiment shown, the scanner 10 is a mobile scanner that can consequently be manually moved and guided around the body part 6 so that the first partial scan in the example of an embodiment shown extends around the entire foot. Since the contact element 2 is situated between the contact surface 8 and the body part 6, only a small part of the contact element 2 is visible. Consequently, only this small part can be included in the first partial scan. Therefore, as indicated by the "+" in FIG. 3, a second partial scan is captured in which the body part 6 has been removed from the contact element 2. This is depicted in the right-hand part of FIG. 3. In the example of an embodiment shown, the contact element 2 is still situated on the contact surface 8, which preferably features reference markings. Since the contact element 2 is in its dimensionally stable state, the capture of the contact element 2 can now be used to infer the part of the body part 6 that was not visible during the capture of the first partial scan.

Figure 4:
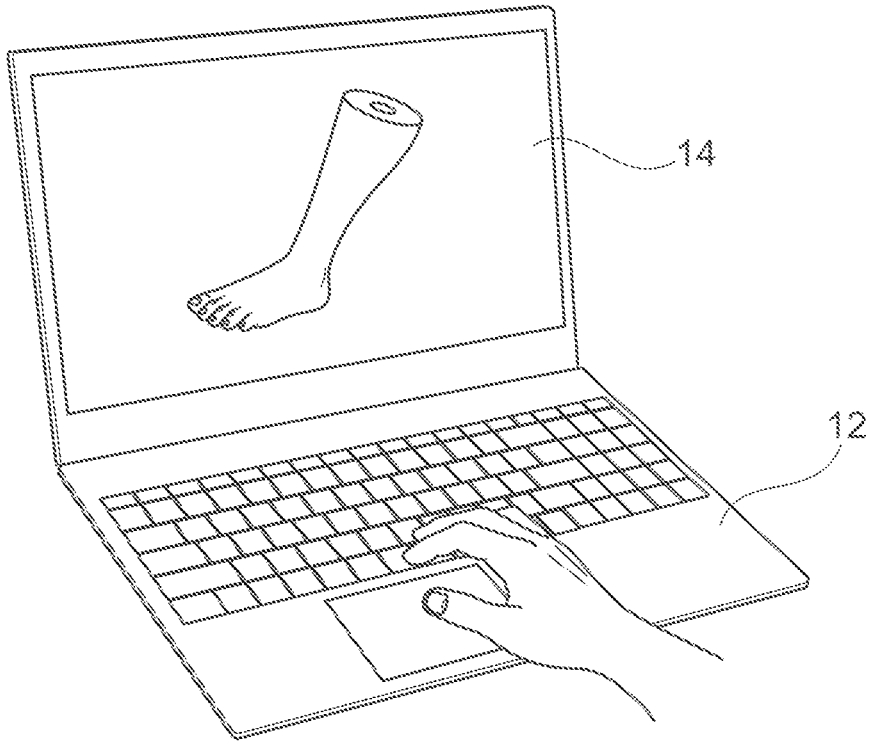

FIG. 4 schematically shows that the first partial scan and the second partial scan are amalgamated in an electronic data processing device 12 to create a 3D scan. This 3D scan is displayed on the monitor 14 of the electronic data processing device 12.

Figure 5:
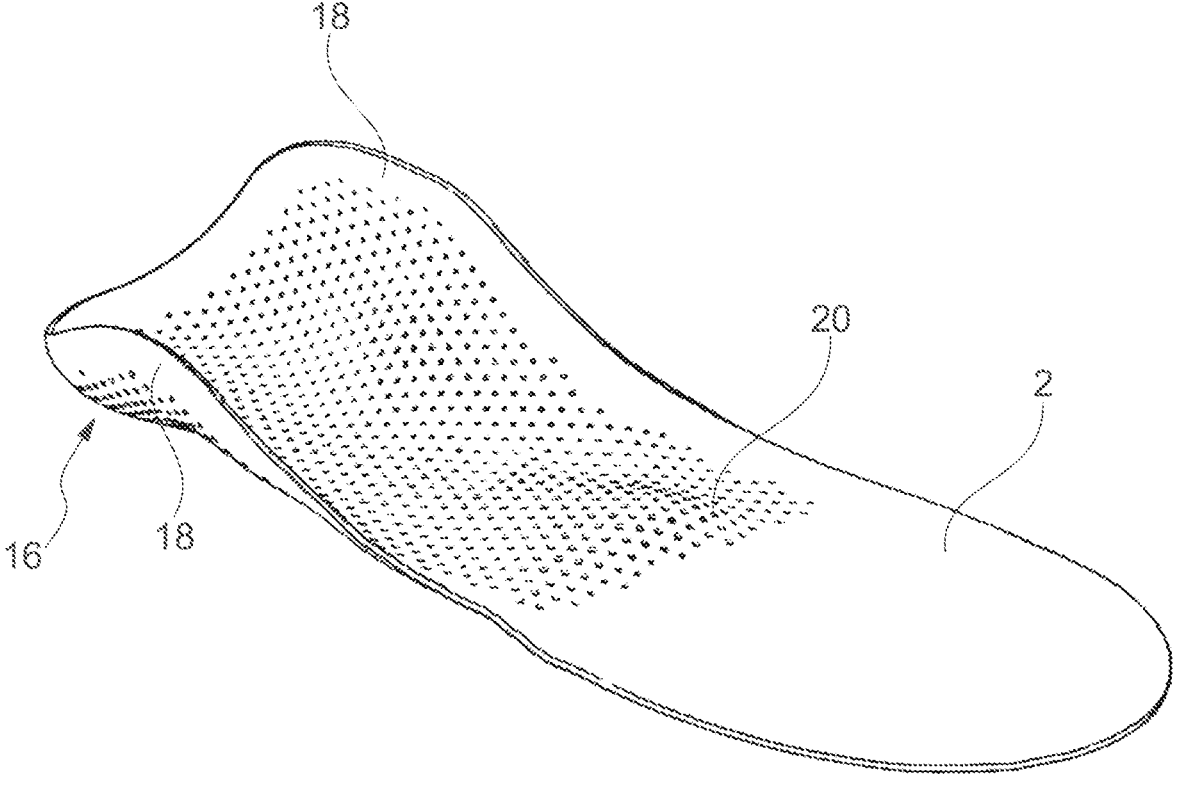

FIG. 5 depicts, in an enlarged representation, a contact element 2 that can be used in a method described here. In FIG. 5, it is in its original shape and is adapted to the shape of a sole of a foot. The heel area 16 features two upwardly curved sections 18, while in the sole area there is a cushioning bulge 20 that mimics an arch of the foot. Of course, other shapes, paddings, cushions or reinforcements are possible. These can then be adapted to the individual body part and worked out during the molding process. The preforming, however, provides the orthopedic technician with initial starting points, so ideally only minor adjustments are necessary.

Figure 6:
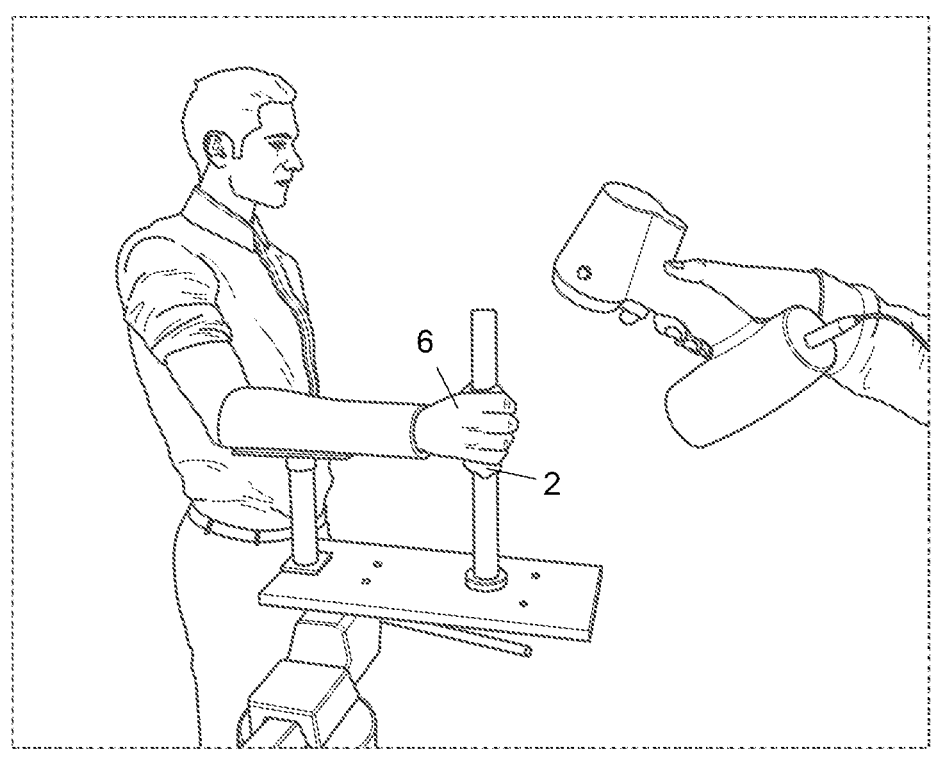
Figure 7:
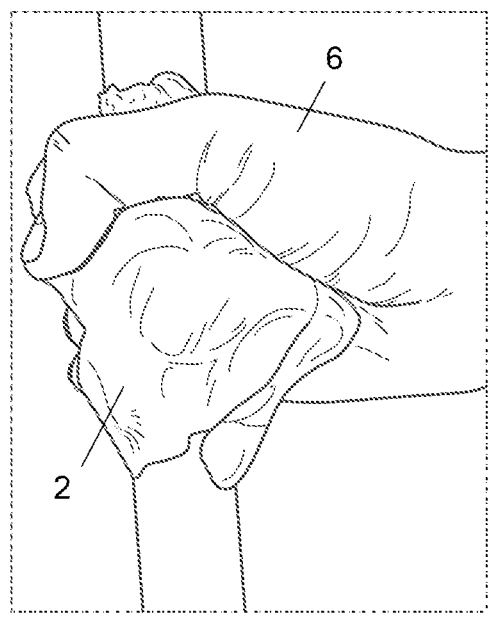

FIG. 6 depicts the capture of the first partial scan using a scanner 10. In the example shown, the body part is an arm with a hand. The lower arm rests on a first contact element 2. The hand surrounds a second contact element 2, depicted in FIG. 7. The hand is brought into a target position by the second contact element 2 and held in this position. The second contact element 2 is made from a quick-hardening material, such as a 2-part silicone, that is arranged on a base body, which is not depicted. The base body is, for example, a tube or a pipe that, for example, which can be of different lengths and/or diameters. This renders it possible to select a suitable base body for the respective hand, so that the amount of hardening material required is reduced as much as possible. Furthermore, the desired target position can be adjusted via the selection of the base body; for example, a larger diameter can be used to bring a hand into a grip pattern that is suitable for holding a glass. Alternatively, the contact element itself can be in different basic shapes and thus force the desired target position.

Figure 8:
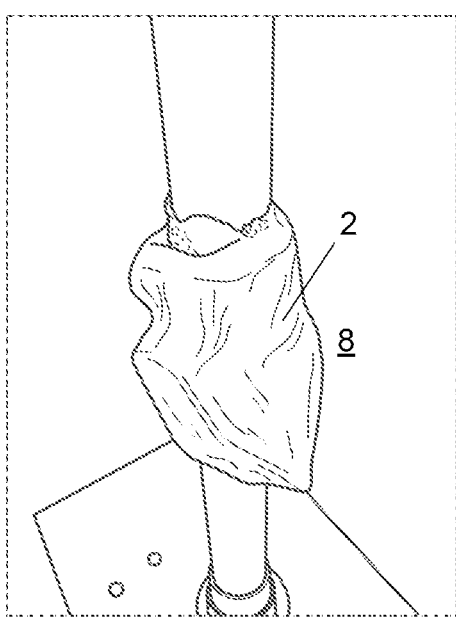

FIG. 8 depicts the second contact element 2 as it is captured in the second partial scan.

REFERENCE LIST

2 contact element
4 container
6 body part
8 contact surface
10 scanner
12 electronic data processing device
14 monitor
16 heel area
18 section
20 bulge

The invention claimed is:

1. A method for creating a 3D scan of a body part, the method comprising:
   a. molding a contact element to the body part, wherein the contact element has an original shape that follows a standard shape of the body part and the contact element includes at least one of a support, a cushion, or padding integrated into the contact element, wherein the contact element covers a hidden part of the body part while in contact with the body part, and wherein a visible part of the body part includes a portion of the body part not covered by the contact element while in contact with the body part,
   b. capturing a first partial scan of the body part while the contact element is in contact with the body part, wherein the first partial scan of the body part captures the visible part of the body part,
   c. removing the body part from the contact element,
   d. capturing a second partial scan of the contact element after removing the body part from the contact element, wherein the second partial scan captures the hidden part of the body part as a negative mold of the contact element, and
   e. creating the 3D scan from the first partial scan and the second partial scan.

2. The method according to claim 1, wherein prior to capturing the first partial scan, the body part is positioned on a contact surface in such a way that the contact element is arranged between the body part and the contact surface.

3. The method according to claim 1, wherein the contact element is brought into a deformable state prior to molding and, after molding on the body part, it is brought into a dimensionally stable state.

4. The method according to claim 3, wherein the contact element is brought into the deformable state by heating, especially in a water bath.

5. The method according to claim 1, wherein the contact element is not moved relative to a reference marking is arranged on a contact surface between capturing the first partial scan and capturing the second partial scan.

6. The method according to claim 1, wherein the first partial scan and/or the second partial scan is captured with a 3D scanner, preferably a mobile 3D scanner.

7. The method according to claim 1, wherein the body part is a foot and the contact element is molded to at least one part of a sole of the foot.

8. The method according to claim 1, wherein the body part is brought into a target position during molding of the contact element.

9. The method according to claim 8, wherein the target position depends on a size, geometric shape and/or design of the contact element.

10. The method according to claim 1, wherein the contact element is made of a silicone that is hardened prior to capturing the first partial scan.

11. A contact element for a method according to claim 1, wherein the contact element can be brought into a deformable state, especially by heating, and into a dimensionally stable state, especially by cooling.

12. The contact element according to claim 11, wherein the contact element is at least also made of a material that deforms into the original shape without an application of external force when it is brought into the deformable state.

13. A method for creating a 3D scan of a body part, the method comprising:
   bringing a contact element into a deformable state;
   molding the contact element to the body part, wherein the contact element has an original shape that follows a standard shape of the body part and the contact element includes at least one of a support, a cushion, or padding integrated into the contact element;
   positioning the body part on a contact surface such that the contact element is arranged between the body part and the contact surface, wherein the contact element covers a hidden part of the body part while in contact with the body part, and wherein a visible part of the body part includes a portion of the body part not covered by the contact element while in contact with the body part;
   capturing a first partial scan of the body part while the contact element is arranged between the body part and the contact surface, wherein the first partial scan of the body part captures the visible part of the body part;
   removing the body part from the contact element;
   capturing a second partial scan of the contact element after removing the body part from the contact element, wherein the second partial scan captures the hidden part of the body part as a negative mold of the contact element; and
   creating the 3D scan from the first partial scan and the second partial scan.

14. The method according to claim 13, wherein the contact element is brough into a dimensionally stable state following molding the contact element to the body part.

15. The method according to claim 13, wherein the contact element is brought into the deformable state by heating in a water bath.

16. The method according to claim 13, wherein the body part is brought into a target position during molding of the contact element.

17. A method for creating a 3D scan of a foot, the method comprising:
   bringing a contact element into a deformable state;
   molding the contact element to at least one part of the foot, wherein the contact element has an original shape that follows a standard shape of the foot and the contact element includes at least one of a support, a cushion, or padding integrated into the contact element;

positioning the foot on a contact surface such that the contact element is arranged between the foot and the contact surface, wherein the contact element covers a hidden part of the foot while in contact with the foot, and wherein a visible part of the foot includes a portion of the foot not covered by the contact element while in contact with the foot;

capturing a first partial scan of the foot while the contact element is arranged between the foot and the contact surface, wherein the first partial scan of the foot captures the visible part of the foot;

removing the foot from the contact element;

capturing a second partial scan of the contact element after removing the foot from the contact element, wherein the second partial scan captures the hidden part of the foot as a negative mold of the contact element; and creating the 3D scan from the first partial scan and the second partial scan.

18. The method according to claim 17, wherein the contact element is molded to an entire sole of the foot.

19. The method according to claim 17, wherein the foot is brought into a target position during molding of the contact element.

\* \* \* \* \*